Aug. 4, 1964
N. A. NELSON
3,143,170
METHOD AND APPARATUS FOR BOREHOLE OPERATIONS
Filed Jan. 23, 1959
5 Sheets-Sheet 4
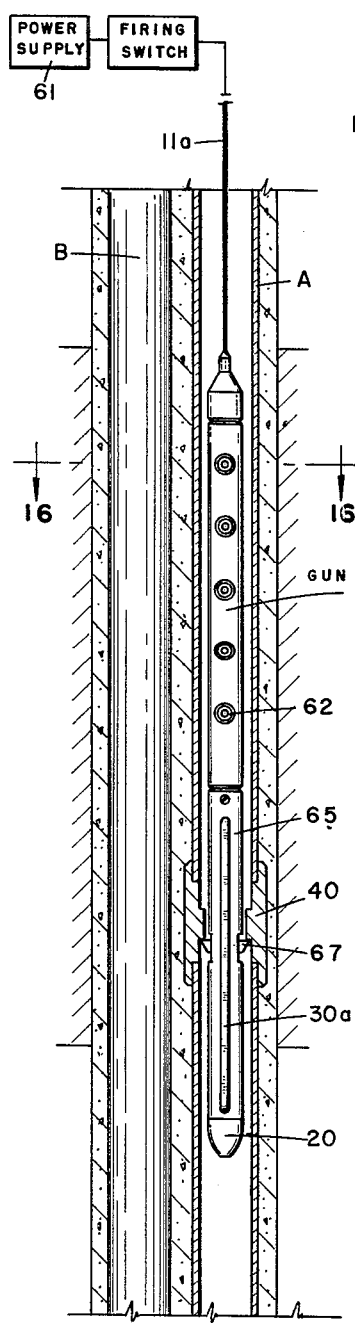
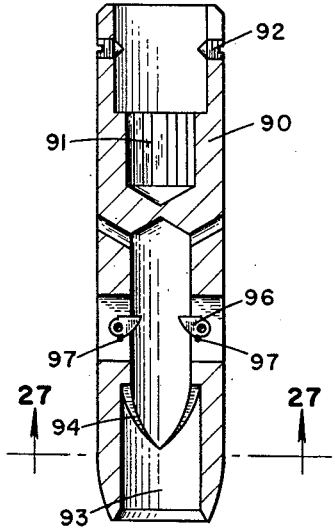
*INVENTOR.*
NORMAN A. NELSON,
BY
*ATTORNEY*

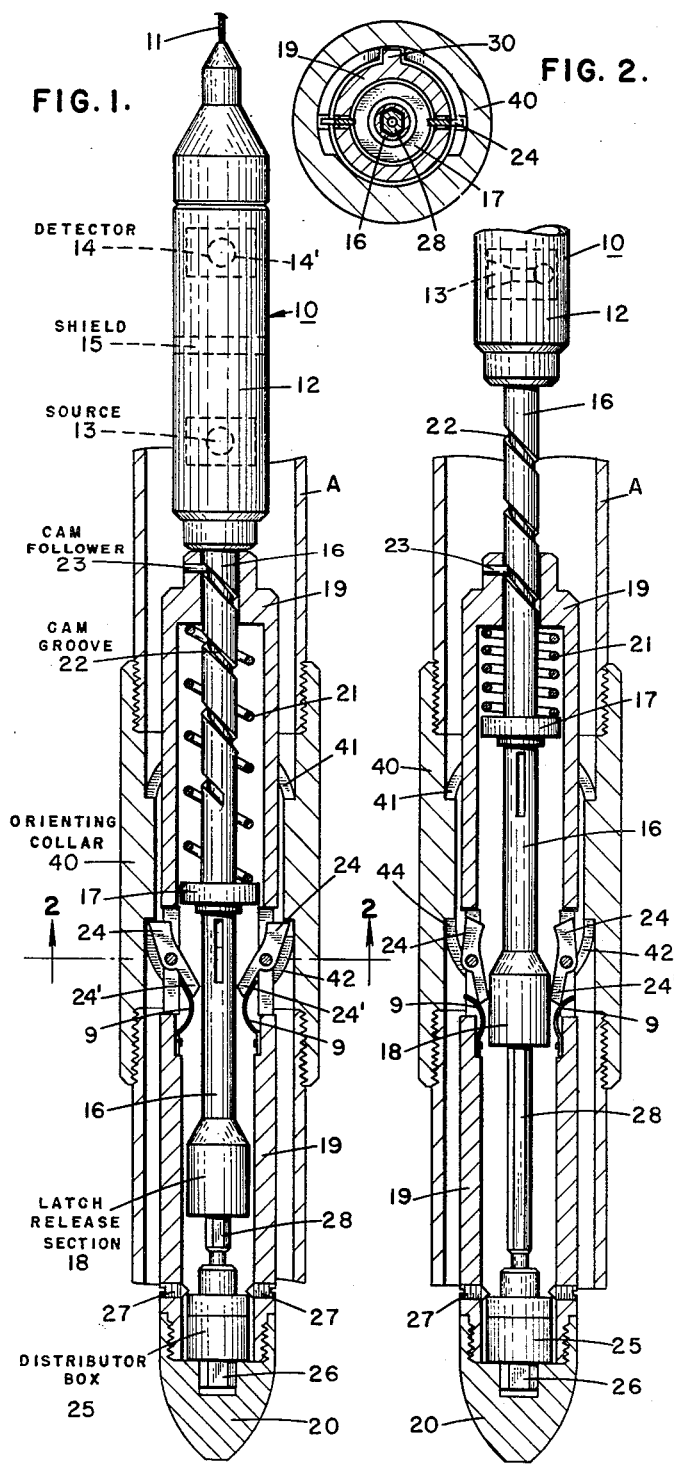

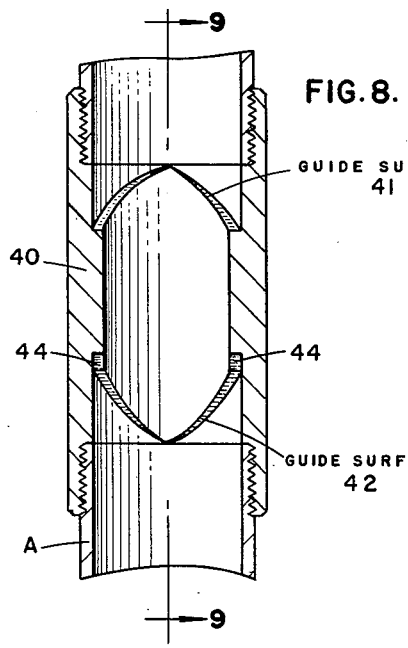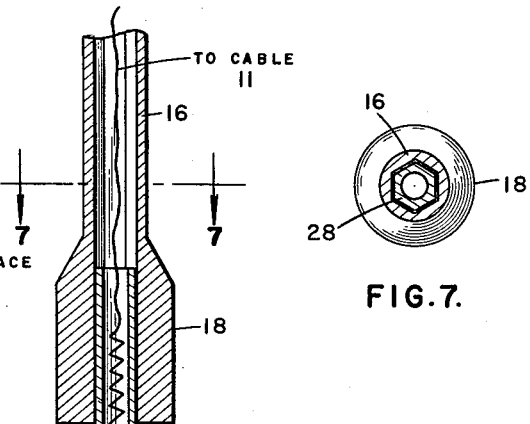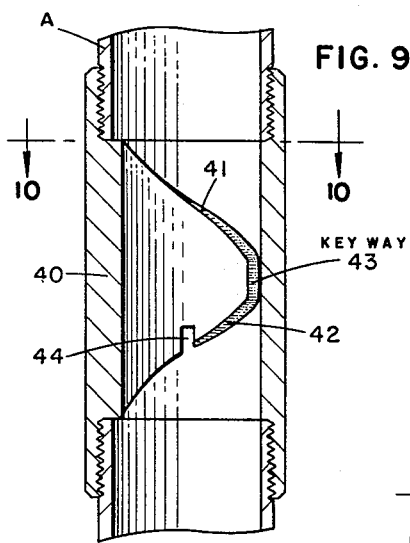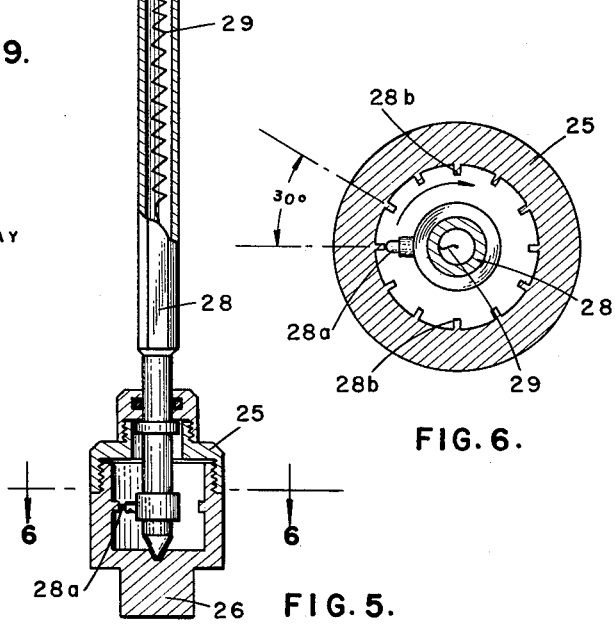

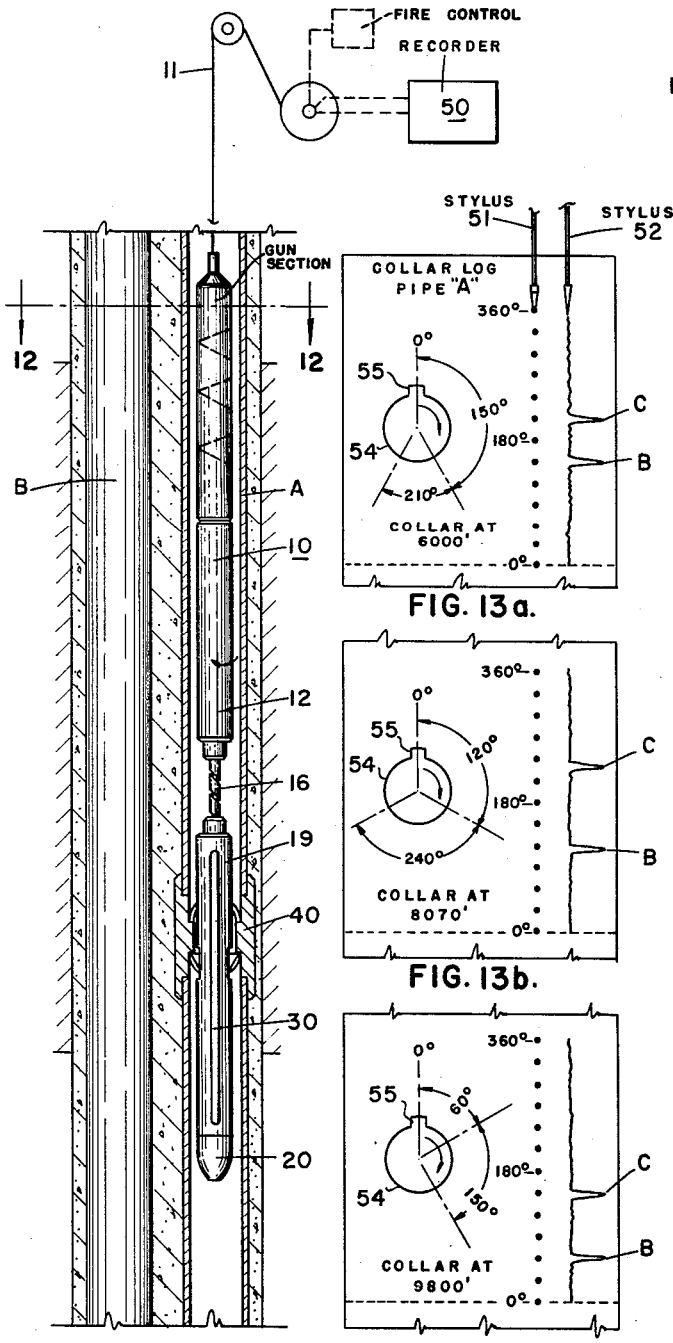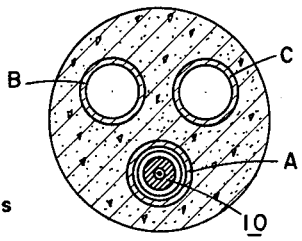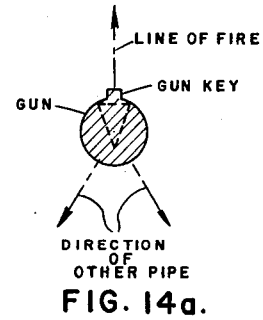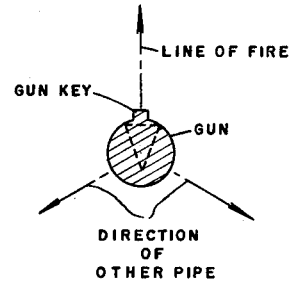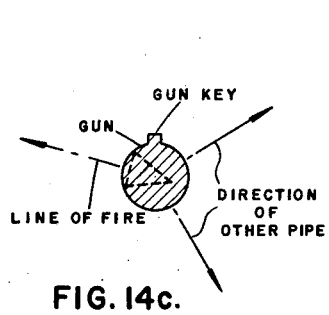

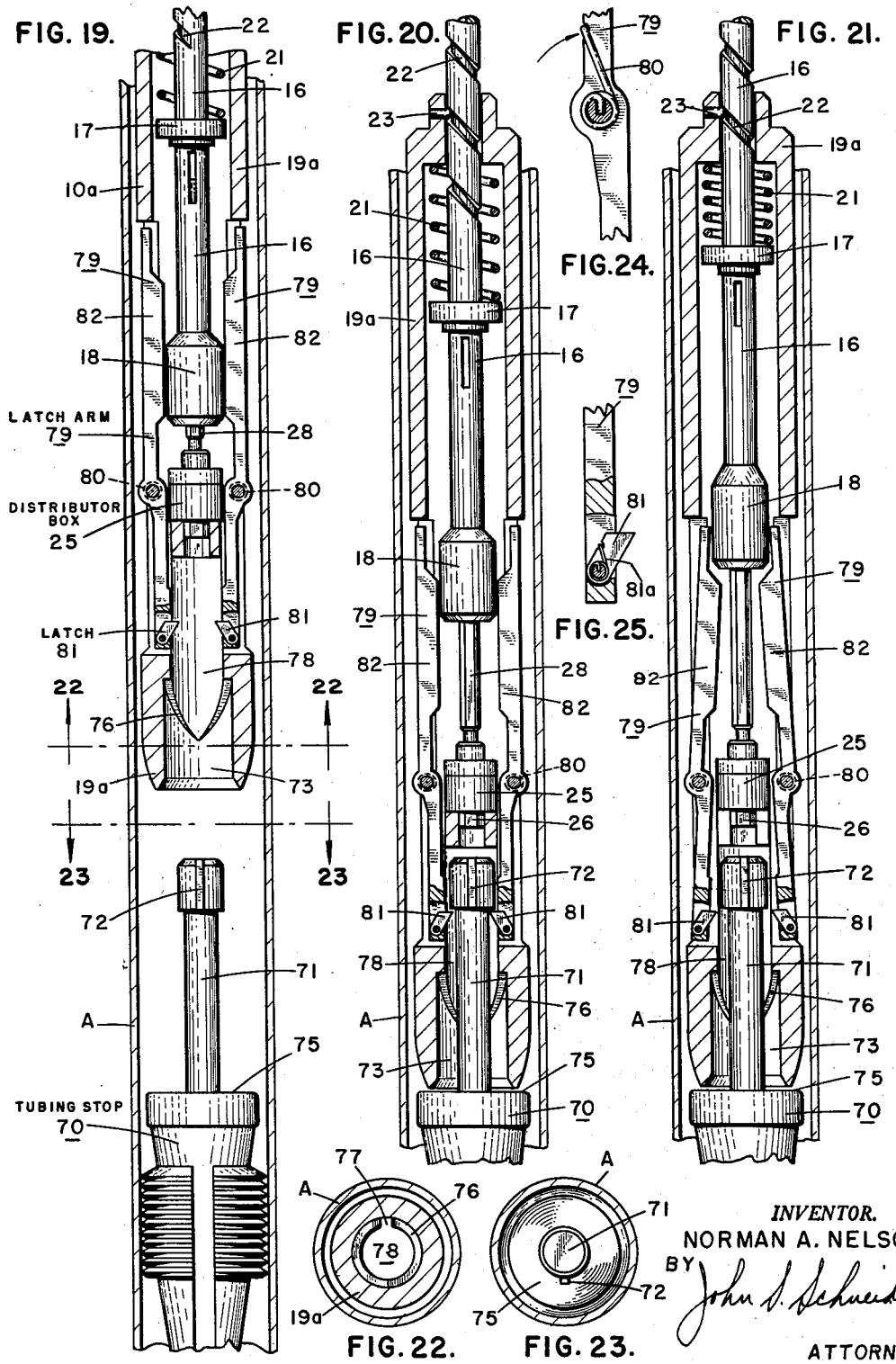

United States Patent Office 3,143,170
Patented Aug. 4, 1964

3,143,170
METHOD AND APPARATUS FOR BOREHOLE OPERATIONS
Norman A. Nelson, South Houston, Tex., assignor, by mesne assignments, to Jersey Production Research Company, Tulsa, Okla., a corporation of Delaware
Filed Jan. 23, 1959, Ser. No. 788,595
15 Claims. (Cl. 166—35)

This invention concerns multiple zone well completions. More particularly, the invention concerns method and apparatus for locating the relative positions of pipe strings arranged in a borehole. In its more particular aspects, the invention concerns method and apparatus for locating pipe strings arranged in a borehole relative to the direction of fire of a gun perforator and for orienting the gun perforator to direct the fire thereof in a direction away from one or more of the pipe strings to avoid perforation of the pipe string(s) or toward one or more of the pipe strings to cause perforation of the pipe string(s).

In multiple zone well operations, a plurality of pipe strings are arranged in a borehole which penetrates a plurality of vertically spaced productive zones and production fluids from each zone are conducted independently to the earth's surface through these pipe strings. In order to perforate a particular interval, a gun perforator is run in the borehole and fired in a direction to cause penetration of the productive formation. However, when at least two pipe strings are positioned adjacent the interval to be perforated, it is necessary to direct the fire of the gun perforator to avoid striking and perforating one or more of the pipe strings other than the pipe string through which the gun perforator is run. Also, in well operations wherein the borehole contains a plurality of pipe strings, it may be desired to direct the fire of the gun perforator to perforate one or more of the pipe strings as, for example, when it is necessary to establish subsurface communication between pipe strings during blowouts, workovers, etc.

These desired results are achieved by the present invention which provides a method for locating and recording the position of pipe strings in a borehole relative to a point of reference established in one of the pipe strings; then, when it is desired to perforate in the well bore, the direction or line of fire is positioned so as to direct fire to avoid one or more of the other pipe strings in the borehole and perforate the formation; or to perforate one or more of the other pipe strings to provide fluid communication between pipe strings. Apparatus is provided for carrying out the method including detector means having a selected arc of detection; means arranged on the detector means and on the pipe string through which the detector means is lowered cooperating to establish a reference position for the detector means; means for rotating the detector means from the reference position to another position; means connected to the detector means for recording rotative positions of the detector means during movement of the detector means from the reference position to the other position; means for recording detection of pipe during movement of the detector means whereby the position of a pipe string or pipe strings relative to the rotative positions of the detector means is recorded; and a gun perforator also provided with means for cooperating with means on the pipe string to position the gun perforator at the reference position, the gun perforator having been previously oriented to direct the fire in any selected direction relative to the reference position. Although the detector means and gun perforator are shown and described as separate instruments, it is within the bounds of the invention to combine the gun perforator and detector means in one instrument by mounting the gun perforator on the detector means. The gun perforator and detector means in this case are rotated together. The pipe strings, other than the pipe string through which the gun perforator and detector are lowered, are then detected and the gun perforator rotated until the line of fire thereof is directed in any selected direction. Radioactivity detection techniques are utilized to locate the pipe strings.

The invention is advantageous in many ways. For example, it avoids the use of permanent gun guides; it permits running pipe strings in the well separately; it permits full and constant openings through all of the pipe string for purpose of production; and it avoids the possibility of an incorrect orientation should a pipe string rotate or slip in a clamp clamping pipe strings together or should the original alignment of the pipe strings be in error.

These purposes and other purposes of the invention will be apparent from a description thereof taken in conjunction with the drawings wherein:

FIG. 1 is a vertical, partly sectional view showing the pipe locator and gun orientator tool of the invention in one position;

FIG. 2 is a plan view taken on lines 2—2 of FIG. 1;

FIG. 3 is a view similar to that of FIG. 1 showing this tool in another position;

FIG. 4 is also a view similar to that of FIG. 1;

FIG. 5 is an enlarged, detailed section of a portion of this tool;

FIG. 6 is a view taken on lines 6—6 of FIG. 5;

FIG. 7 is a view taken on lines 7—7 of FIG. 5;

FIG. 8 is a sectional view of keyways arranged in the pipe string;

FIG. 9 is a view taken on lines 9—9 of FIG. 8;

FIG. 10 is a view taken on lines 10—10 of FIG. 9;

FIG. 11 is a cross-sectional view of the earth's subsurface showing a borehole having pipe strings arranged therein, one of which contains the tool of FIG. 1; also shown is surface apparatus for use with this tool;

FIG. 12 is a view taken on lines 12—12 of FIG. 11;

FIGS. 13a, b, and c illustrate one type of record for establishing the relative locations of pipe strings;

FIGS. 14a, b, and c are schematic representations illustrating positioning of the direction of fire of the perforator relative to the pipe location as determined by the records of FIGS. 13a, b, and c, respectively;

FIG. 15 is a cross-sectional view of the earth's subsurface showing a borehole having pipe strings arranged therein, one of which contains a perforator and orienting apparatus therefor; also shown schematically is surface equipment for firing the perforator;

FIG. 16 is a view taken on lines 16—16 of FIG. 15 showing relative positions of the pipe strings of FIG. 15 and the direction of fire of the perforator;

FIGS. 17 and 18 are detailed views of the apparatus of FIG. 15;

FIGS. 19, 20, and 21 are vertical views of a modified gun perforator orienting tool showing the tool in different positions;

FIG. 22 is a view taken on lines 22—22 of FIG. 19;

FIG. 23 is a view taken on lines 23—23 of FIG. 19;

FIGS. 24 and 25 are detailed views of latch members provided on the tool;

FIG. 26 is a cross-sectional view of the lower portion of a gun perforator housing to be used in the modified embodiment of FIGS. 19–25; and FIG. 27 is a view taken on lines 27—27 of FIG. 26.

Referring to FIGS. 1 to 7 in greater detail, a pipe locator tool, generally designated 10, is suspended in a pipe string A on a multi-electrically conductive cable 11 and positioned in a collar 40 which is connected into pipe string A. Tool 10 includes an upper housing 12 containing pipe indicating means such as a radiation source 13 and a collimated detector of radiation 14. The collimating effect is obtained by means of a radiation absorbing or moderating shield 14'. In this technique, source 13 bombards the surrounding area and the radiation induced by this bombardment is detected by detector 14. To insure that detector 14 detects induced radiation and not direct radiation from source 13, a shield 15 may be interposed between the detector and the source to moderate or absorb direct radiation from source 13. Affixed to the lower end of housing 12 is a vertically extending, hollow rod 16. At approximately midway its length, rod 16 is provided with an annular shoulder 17. The lower end of rod 16 is enlarged to provide a latch release section 18. Enclosing rod 16 is a lower housing 19 which is provided on its lower end with a nose plug 20. Lower housing 19 is biased upwardly against upper housing 12 by a helical coil spring 21, the lower end of which biases against shoulder 17 and the upper end of which biases against the upper end of housing 19. The upper end of rod 16 is formed to provide a helical groove cam surface 22 which operably engages with a cam follower or pin 23 positioned in the upper end of housing 19. Externally projecting spring biased latches 24 are pivotally mounted in the wall of housing 19 approximately midway its length and arranged 180° apart. As seen more clearly in FIGS. 1 and 3, the internally projecting ends 24' of latches 24 are biased against the outer surface of hollow rod 16 by means of spring members 9 attached to housing 19. As seen in FIG. 4, a vertically extending key 30 is affixed to the outer surface of housing 19 and extends approximately the full length thereof (see FIG. 11). Key 30 is positioned 90° from each of the latches 24.

Positioned in nose plug 20 of housing 19 is an electrical indicator means such as distributor box 25. Box 25 is held against rotational movement by a spline portion 26 and against vertical movement by set screws 27 which engage the top of box 25. Projecting upwardly from distributor box 25 is a splined rotor member 28. As seen in FIGS. 5 to 7 especially, the lower end of rotor 28 which is enclosed in box 25 is provided with a contact member 28a which operably contacts contact points 28b, which are equally spaced about the inner wall of box 25. The upper end of rotor 28 slidably fits into the splined interior lower end of hollow rod 16. Electrical connection is made with contact 28a through a lead 29 which extends through rotor 28 and hollow rod 16 to conductor cable 11. Contact points 28b are ground connections which, when engaged by contact 28a, complete an electrical circuit.

Referring particularly to FIGS. 8, 9, and 10, collar 40 is formed to provide internally projecting upper and lower guide surfaces 41 and 42 which meet to form a keyway or slot 43. Lower guide surface 42 is notched to form latch recesses 44 spaced 180° apart and 90° from keyway 43. Recesses 44 are adapted to be engaged by latches 24 and are substantially narrower in width than key 30 of housing 19 so that the entrance of key 30 into keyway 43 is not hindered in any way.

In FIGS. 11 and 12 the arrangement of tool 10 in pipe A and the relative positions of additional pipe strings B and C are more clearly shown. Also, the connection of cable 11 to a radiation indicator recorder 50 is seen in FIG. 11. Although only one collar or coupling 40 is shown in FIG. 11, any desired number may be used in one or more of the pipes A, B, and C.

Collars 40 are positioned at predetermined intervals so that when pipe strings A, B, or C are run in the borehole and cemented in place, the orienting collars will be positioned adjacent zones or formations it is desired to perforate. The circumferential position of keyway 43 is not known when the pipe strings are originally set in the borehole.

In operation, tool 10 is lowered in pipe string A on cable 11, the two housings 12 and 19 being biased together by coil spring 21, as seen in FIGS. 1 and 4, until the tool contacts collar 40. As tool 10 comes into contact with collar 40, key 30 strikes the upper guide surface 41 rotating the tool until key 30 is in keyway 43, as seen in FIGS. 8 through 10. This permits the tool to be lowered through the collar. After tool 10 has been lowered through the lowermost collar 40, the tool is raised. Upon raising of the tool when it contacts collar 40, key 30 strikes lower guide surface 42 and the tool is rotated until key 30 is in keyway 43 and latches 24 engage and latch in latch recesses 44. Engagement of key 30 in keyway 43 prevents lateral or rotational movement of lower housing 19 and engagement of latches 24 in latch recesses 44 prevent upward movement of lower housing 19. Thereafter, upper housing 12 is pulled upwardly with respect to lower housing 19 by means of cable 11. This upward movement of upper housing 12 causes rotation thereof in a clockwise direction as cam follower 23 travels in cam groove 22 of rod 16. Upper housing 12 makes at least one complete revolution when cam follower 23 travels the length of cam groove 22. This permits the confined or restricted arc of detection detected by detector 14 by means of collimating shield 14' to make a complete 360° traverse or sweep of the borehole. Accordingly, pipe detected during this sweep of the borehole by the directed arc of detection is recorded by recorder 50 relative to a reference starting position of the rotative movement of housing 12 and the radial positions of the pipes in the circle swept by the revolution of the arc of detection are ascertained. Simultaneously with recording of the pipe detected, rod 16 rotates rotor member 28 through the splined connection therebetween which, in turn, rotates electrical contact member 28a through a 360° circle and in its travel contacts incrementally spaced contact points 28b which completes an electrical circuit at spaced circumferential intervals. This information is recorded by recorder 50 which provides an indication of the degrees of rotation relative to a reference starting point since the number and spacing of contact points 28b are predetermined and known. This operation is more clearly seen in FIGS. 13a, b, and c, to which reference is now made. For purposes of illustration only, records for depths of 6,000 feet, 8,070 feet, and 9,800 feet are shown in FIGS. 13a, 13b, and 13c, respectively. The positioning collars 40 were initially arranged in pipe string A so that when pipe string A was run in the borehole, the collars would be positioned at these depths. Twelve contact points 28b are provided; thus, the electrical circuit is completed every 30° during rotation of the tool. This is illustrated in FIG. 13a by the dots starting with 0° and ending with 360° recorded by stylus 51. The radiation detected is recorded by stylus 52 and this record shows pipes or indications of pipes B and C at points 150° and 210° from the reference starting point 0°. This is illustrated to the left of the recording schematically by the circle 54 provided with the symbolic keyway 55 which may be used as the 0° or reference starting point. In FIG. 13b, pipes B and C are indicated to be at points approximately 120° and 240° from the reference or zero starting point. In FIG. 13c, pipes B and C are shown to be at 60° and 150°, respectively, from the 0° or reference starting point. When the record has been completed, housing 12 is in an upper position and, if desired, the record may be repeated at the same level in the borehole merely by lowering housing 12 to its initial position and then raising the housing to record in a complete 360° revolution. When it is desired to remove the tool from the borehole or to raise the tool to position it adjacent an upper collar 40, upper housing 12 is raised further by cable 11 until rod 16 has made a predetermined additional rotation. This additional rotation brings enlarged latch release section 18 of rod 16 in contact with internally projecting ends of latches 24, as shown in FIG. 3, whereby latches 24 are released from engagement with recesses 44 in collar 40. When latches 24 have been released, spring 21 biases lower housing 19 upwardly against upper housing 12, as shown in FIG. 4. After a permanent record has been made at each of the collar locations, the pipe locator tool is removed from the borehole.

Once a permanent record has been made, a properly oriented, perforator gun is positioned in collar 40, the orientation of the gun directing the fire thereof in any desired direction. The same point of reference established by the key slot in collar 40 is used to position the direction of fire of the gun perforator. FIGS. 14a, b, and c illustrate positioning of the gun perforator so as to direct the line of fire to avoid perforating pipe strings B and C with respect to the position of the pipe strings at the depth shown in FIGS. 13a, b, and c, respectively. Thus, in FIG. 14a, the line of fire of the gun perforator is preferably directed radially outwardly at the 0° or reference point. A similar direction holds for FIG. 14b. In FIG. 14c, the direction or line of fire of the gun perforator is preferably at an angle of about 280° from the 0° position represented by the key slot.

Gun perforator apparatus is shown in FIGS. 15 through 18. A gun housing 60 is suspended in pipe A by means of an electrical cable 11a which extends to the earth's surface where it connects to a firing switch and power source 61. Gun housing 60 is provided with vertically spaced-apart gun elements 62 which may be of the bullet or shaped charge type, as desired. It is preferable for the gun elements to be positioned so as to direct the fire thereof in the same direction; however, if desired, additional gun elements 62 spaced laterally from those shown may be employed. The lower end of housing 60 terminates in a twelve-sided splined section 63 which engages with a correspondingly splined recess 64 in a locator housing 65. Housings 60 and 65 are firmly connected together by means of set screws 66 or the like. Housing 65 is provided with a vertically extending, externally positioned key 30a, similar to the key 30 of housing 19, which runs approximately the full length of housing 65. Latch members 67 are pivotally mounted in the exterior wall of housing 65, as shown in FIG. 18. Latches 67 are biased outwardly by a spring 68 but are allowed only limited movement by a shear pin stop 69. Latches 67 are spaced 180° apart and each is spaced 90° from key 30a similarly to the positioning of the latches of housing 19. Key 30a is adapted to slide into keyway 43 and latches 67 are adapted to engage with latch recesses 44 of collar 40.

The spline arrangement interconnecting housings 60 and 65 permits directing the line or direction of fire of gun elements 62 in any desired direction relative to key 30a. Thus, once the positions of the pipes relative to the direction of keyway 43 have been recorded and established, gun housing 60 may be rotated and then connected to housing 65 so that gun elements 62 are positioned to direct the fire of the gun perforator in any predetermined direction relative to the position of key 30a which, in turn, is the position of keyway 43. In this manner, the proper orientation of the gun perforator to avoid striking or perforating pipe strings B and C, as illustrated in FIGS. 14a, b, and c, may be made. Or, if desired, the gun may be oriented to perforate either or both pipe strings B and C. After the perforator gun has been fired, it may be removed from the connection to collar 40 by jarring upwardly on cable 11a to shear pin stop 69 to release latches 67 from recesses 44.

In FIGS. 19 through 25, a modified apparatus is shown. The essential difference in this apparatus from that shown and described with regard to FIGS. 1 through 18, is that instead of providing the pipe string with a collar having a keyway therein which is used as an orientation positioner for the pipe locator and for the gun perforator, a tubing stop is positioned in the desired pipe string and provided with a key which provides the reference position for the detector and for the gun perforator. Thus, referring to FIGS. 19 through 25, a tubing stop 70 is lowered on a wire line in pipe string A and set at any desired depth. A tubing stop of this type is conventional in the art and is disclosed in the Composite Catalog of Oil Field and Pipe Line Equipment, 19th Ed., on page 4074. The only difference is that the tubing stop, shown in FIG. 19, is modified from that shown in the Composite Catalog to provide on a neck portion 71 a projecting key member 72. A pipe locator tool 10a is then lowered in pipe string A and positioned on tubing stop 70 in a manner similar to the manner in which tool 10 was positioned in collar 40. The only difference in structure resides in the lower portion of housing 19, which housing is designated 19a in this embodiment. The lower end of housing 19a is provided with an opening 73 which is designed to be stabbed over neck 71 of stop member 70. Provided on the inner wall of housing 19a forming the opening 73 is an internally projecting guide surface 76 which terminates in a slot or keyway 77, as shown in FIG. 22. The guide surface 76 forms an opening 78 of a diameter just slightly larger than the outside diameter of the upper end of neck 71 of stop member 70. When tool 10a is lowered over neck 71 of stop member 70, the guide surface 76 comes into contact with key 72 and tool 10a is thereby rotated to bring keyway 77 into engagement with key 72 and tool 10a is lowered further until the bottom of housing 19a abuts against shoulder 75 of stop member 70, as seen in FIG. 20. Housing 19a similarly to housing 19 encloses cammed rod 16 which is the same as rod 16 of the previous figure. The remaining structure is the same. Rod 16 is splined to rotor member 28 which is rotatably mounted in distributor box 25 which, in turn, is mounted in the same manner in housing 19a as in housing 19.

Pivotally mounted in the wall of housing 19a are a pair of latch arms 79. The upper ends of latch arms 79 are biased inwardly against the enlarged portion 18 of rod 16 by means of spring members 80, as seen in FIG. 24. The lower ends of latch arms 79 are each provided with latches 81 which are normally biased by springs 81a (FIG. 25) to extend into opening 78 formed by guide surface 76 to engage with the underside of the enlarged head of the upper end of neck 71 of stop member 70, as seen in FIG. 20. The upper sections of latch arms 79 are formed to provide enlarged portions 82 which engage with section 18 of rod 16 to maintain latch arms 79 in a vertical position. When the pipe detecting section or upper housing 12 is raised by cable 11 and rotated by means of spiral groove 22 and pin 23, the rod portion 18 remains in contact with the enlarged portion 82 of latch arms 79 until housing 12 has been rotated 360°, during which rotation the record of the positions of the pipe strings relative to the reference position or key 72 is obtained. Further, upward movement and rotation of housing 12 and rod 16 raises section 18 out of contact with the enlarged latch arm section 82. This permits springs 80 to bias the upper ends of the arms inwardly, therefore moving the lower ends of the arms outwardly. Outward movement of the lower ends of arms 79 releases latches 81 from engagement with neck 71 and spring 21 in housing 19a forces housing 19a upwardly against the bottom of housing 12. This upward movement of housing 19a brings the assembly back into position, as seen in FIG. 19. Tool 10a then is removed from pipe string A.

Once the positions of the pipes relative to the position of key 72 is recorded and established, a gun perforator provided with a keyway, similar to the keyway on the bottom of tool 10a, may be run in and engaged with stop member 70 to automatically orient it with regard to the pipe strings in the borehole.

FIGS. 26 and 27 illustrate a device to position a gun perforator on the tubing stop 70. The device consists of a housing 90 provided with a splined opening 91 in the top thereof for receiving the lower end of a gun housing such as 60 of FIG. 17. Set screws 92 are also provided. The lower end of housing 90 is formed to provide an opening 93. A guide surface 94, provided on the inner wall forming opening 93, terminates in a slot or keyway 95. This device operates the same as the lower end of the apparatus of FIGS. 19 to 25.

Spring biased pivot latches 96 are positioned in the wall of housing 90 and are held in position as shown by shear pins 97. The latches serve to indicate to the operator of the gun that the assembly is positioned on and connected to the tubing stop 70 as they latch underneath the upper end of neck 71 of tubing stop 70. The gun can be released from the tubing stop by jarring upwardly on a cable such as 11a (FIG. 15) and shearing shear pins 97. After firing of the gun perforator to perforate a formation or to perforate pipe strings, it is removed and the tubing stop member may be removed also, if desired.

The particular adaptations of the equipment described may be modified. For example, the gun perforator may be connected directly to the pipe locator tool in either of the embodiments. This arrangement is illustrated in FIG. 11 by the gun section connected to housing 12. Thus, the direction of pipe detection is established relative to the direction of fire of the gun elements and by rotating the detector and establishing the positions of the pipe strings, the gun perforator may be oriented so as to fire to avoid pipe strings or to perforate pipe strings. In an operation of this nature, the mechanism or apparatus for providing a permanent record; that is, the distributor box and associated elements may be omitted. This type operation applies to both of the embodiments described and shown herein.

The source of radiation 13 may be fast neutrons or gamma rays. Thus, the source of radiation may be an alpha-neutron ($\alpha$,n), deuteron-neutron (d,n), or proton-neutron (p,n) reaction wherein the alpha particle, deuteron, or proton is accelerated by an electric field and thereby caused to interact with selected target materials in order to produce neutrons of various energies within the confines of source 13; or the radiation source may be neutrons originating from a radium-beryllium or polonium-beryllium source. Sources of high energy gamma radiation which may be employed are: radioactive $Na^{24}$, $La^{40}$, $Sb^{124}$, $Co^{60}$, or high energy gamma rays produced by various reactions in high energy particle machines in a manner well known to the art of nuclear physics. For example, the bombardment of lithium by protons produces high energy 17 mev. gammas.

Detector 14 detects slow neutrons or gamma rays or fast neutrons and for detection of this radiation, ionization chambers, Geiger-Müller tubes, and scintillation counters may be used.

Shields 14' and 15 are formed of radiation absorbing or moderating materials, such as lead, tungsten, paraffin, boron, cadmium, etc., which materials are capable of absorbing or moderating the induced radiation. If the source of radiation is neutrons and the induced radiation is neutrons, then as tool 10 is placed in position by raising and lowering thereof, a lower reading on indicator or recorder 50 is observed when the radially directed arc of investigation of detector 14 is toward pipe string B or C than when the arc of investigation is away from these pipe strings.

For purposes of illustration, the arrangement of the detector is collimating induced radiation to confine the radiation detected to a selected arc. Other arrangements are possible, for example, the radiation emitted by the source may be collimated to direct and confine the radiation to a selected arc of the borehole. Or, instead of detecting induced radiation, radiation emitted by radioactive material placed adjacent to the pipe string to be detected may be employed. Or it may be desired to detect the peak energy from a specific chemical element in accordance with spectral gamma ray logging practice. In this instance, a compound containing sulfur, for example, when bombarded with neutrons emits a gamma ray of a specified energy. By placing this compound adjacent the pipe string to be detected, the location of the pipe string is readily determined.

The invention is applicable to so-called tubingless completions; that is, wells completed without setting casing. This procedure, which is illustrated in FIG. 1, includes running the desired pipe strings in the borehole and cementing the pipe strings in place. The invention is also applicable to cased wells; that is, where a casing is run in the borehole and cemented in place and the tubing strings are arranged within the casing.

Having fully described the apparatus, objects, and operation of my invention, I claim:

1. Apparatus for use in a borehole containing at least two spaced-apart pipe strings comprising rotatable pipe detector means having a selected radial arc of detection arranged in one of said pipe strings; means arranged on said pipe detector means and in said one pipe string cooperating to establish a fixed reference position for said detector means; means connected to said pipe detector means for controllably rotating said pipe detector means so that said radial arc of detection is rotated from one position to another relative to said reference position; means connected to said pipe detector means for permanently recording rotational positions of said pipe detector means during rotation thereof and for permanently recording detection of pipe during rotation of said pipe detector means so that the radial position of said other pipe string relative to the established reference position of said pipe detector means is permanently recorded.

2. Apparatus as recited in claim 1 wherein said means arranged on said pipe detector means and in said one pipe string cooperating to establish said reference position for said pipe detector means comprises a key arranged on the outer surface of said pipe detector means and a collar in said one pipe string, said collar having a key slot engageable with said key.

3. Apparatus as recited in claim 1 wherein said means arranged on said pipe detector means and in said one pipe string cooperating to establish said reference position for said pipe detector means comprises a tubing stop having a key arranged on the outer surface thereof and a key slot arranged on said pipe detector means, said key slot being engageable with said key.

4. Apparatus for use in a borehole containing at least two spaced-apart pipe strings comprising a rotatable pipe detector means arranged in one of said pipe strings; means arranged on said pipe detector means for confining pipe detection to a selected arc of said borehole; a rotatable rod movable longitudinally between two positions connected to said pipe detector means and provided with a helical cam groove, an annular shoulder, a splined lower interior, and a tapered shoulder; a housing surrounding said rod and provided with a cam follower engagedly connecting with said cam groove, a key on the outer surface thereof and a releasable collar latch; a spring surrounding said rod and arranged between said annular shoulder and said housing adapted to bias said housing upwardly; said one pipe string being provided with at least one collar having a key slot for engaging said key; guide surfaces arranged on said collar above and below said key slot for guiding said key into and out of said key slot; a collar recess for engaging said latch; a splined shaft mating with the splined interior of said rod; a recorder adapted to record rotational positions of said pipe detector means and the position of said other pipe string relative to said rotational positions of said pipe detector means; a rotatable contact connected to said splined shaft and electrically connected to said recorder; and a plurality of circumferentially and uniformly spaced stationary contacts arranged on the interior of said housing, each stationary contact successively engaging said rotatable contact upon rotation thereof.

5. Apparatus for use in a borehole containing at least two spaced-apart pipe strings comprising a rotatable pipe detector means arranged in one of said pipe strings; means arranged on said pipe detector means for confining detection to a selected arc of said borehole; a rotatable rod movable longitudinally between two positions connected to said pipe detector means and provided with a helical cam groove, an annular shoulder, a splined lower interior and latch release means; a housing surrounding said rod and provided with a cam follower engagedly connecting with cam groove, a guide surface, a key slot, and latch means; a spring surrounding said rod and arranged between said annular shoulder and said housing adapted to bias said housing upwardly; said one pipe string being provided with a tubing stop having a key arranged thereon adapted to engage said key slot, said guide surface being adapted to guide said key slot onto said key; said latch means releasably engaging said tubing stop and operably engaging said latch release means; a splined shaft engaging the splined interior of said rod; a recorder adapted to record rotational positions of said pipe detector means and the position of said other pipe string relative to said rotational positions of said pipe detector means; a rotatable contact connected to said splined shaft and electrically connected to said recorder; and a plurality of circumferentially and uniformly spaced stationary contacts arranged on the interior of said housing, each stationary contact successively engaging said rotatable contact upon rotation thereof.

6. Apparatus for use in a borehole containing at least two spaced-apart pipe strings comprising a housing lowerable in one of said pipe strings and provided with a guide surface, releasable latch means, and a key slot; a tubing stop anchored in said one pipe string and provided with a key; said guide surface cooperating with said key to guide said key slot onto said key and means adapted to releasably engage said latch means to prevent upward movement of said housing; and a perforator having a selected radial direction of perforation and mounted on said housing such that the direction of perforation thereof is fixed in a selected angular direction relative to the position of said key slot.

7. Apparatus for use in a borehole containing at least two spaced-apart pipe strings comprising a housing lowerable in one of said pipe strings and provided with releasable latch means and a key; a pipe collar arranged in said one pipe string and provided with a key slot, a guide surface for guiding said key into said key slot, and means for releasably engaging said latch means; and a perforator having a selected radial direction of perforation and mounted on said housing such that the direction of perforation thereof is fixed in a selected angular direction relative to the position of said key.

8. Apparatus for use in a borehole containing at least two spaced-apart pipe strings comprising a rotatable pipe detector means arranged in one of said pipe strings; means arranged on said pipe detector means for confining pipe detection to a selected arc of said borehole; a rotatable rod movable longitudinally between two positions connected to said pipe detector means and provided with a helical cam groove, an annular shoulder, a splined lower interior and a tapered shoulder; a housing surrounding said rod and provided with a cam follower engagedly connecting with said cam groove, a key on the outer surface thereof and a releasable collar latch; a spring surrounding said rod and arranged between said annular shoulder and said housing adapted to bias said housing upwardly; said one pipe string being provided with at least one collar having a key slot for engaging said key; guide surfaces arranged on said collar above and below said key slot for guiding said key into and out of said key slot; a collar recess for engaging said latch; and a splined shaft secured to said housing and mating with the splined interior of said rod.

9. Apparatus for use in a borehole containing at least two spaced-apart pipe strings comprising a rotatable pipe detector means arranged in one of said pipe strings; means arranged on said pipe detector means for confining the detection to a selected arc of said borehole; a rotatable rod movable longitudinally between two positions connected to said pipe detector means and provided with a helical cam groove, an annular shoulder, a splined lower interior and latch release means; a housing surrounding said rod and provided with a cam follower engagedly connecting with said cam groove, a guide surface, a key slot, and latch means; a spring surrounding said rod and arranged between said annular shoulder and said housing adapted to bias said housing upwardly; said one pipe string being provided with a tubing stop having a key arranged thereon adapted to engage said key slot, said guide surface being adapted to guide key slot onto said key; said latch means releasably engaging said tubing stop and operably engaging said latch release means; and a splined shaft secured to said housing and mating with the splined interior of said rod.

10. A method for perforating in a well bore having a plurality of pipe strings arranged therein in side-by-side relationship comprising the steps of:
   establishing a fixed orientation reference point in one of said pipe strings;
   detecting and permanently recording the angular position of another of said pipe strings relative to the angular position of said reference point;
   orienting in said one pipe string the direction of perforation of a perforator having a selected radial direction of perforation relative to the angular position of said reference point; and then
   actuating said perforator.

11. A method as recited in claim 10 including orienting said direction of perforation away from said other pipe string.

12. A method as recited in claim 10 including orienting said direction of perforation towards said other pipe string.

13. A method for perforating in a well bore having a plurality of pipe strings arranged therein in side-by-side relationship comprising the steps of:
   arranging in one of said pipe strings at least one fixed reference positioning means adapted to co-operate with a first positioning means arranged on a rotatable pipe detector means having a selected radial direction of pipe detection to establish an angular reference position in said one pipe string for said detector means and also adapted to co-operate with a second positioning means arranged on a rotatable perforator having a selected radial direction of perforation to establish an angular reference position in said one pipe string for said perforator;
   positioning said pipe detector means in its angular reference position in said one pipe string;
   rotating said pipe detector means from its reference position and detecting and permanently recording the angular position of another pipe string relative to said reference positioning means;
   removing said pipe detector means from said one pipe string;
   positioning said perforator in its angular reference position in said one pipe string;
   rotating said perforator from its reference position and orienting the direction of perforation of said perforator as determined by the recorded position of said reference positioning means and the recorded position of said other pipe string; and then
   actuating said perforator to perforate.

14. A method for perforating in a well bore having a plurality of pipe strings arranged therein in side-by-side relationship comprising the steps of:
   arranging in one of said pipe strings at least one fixed reference positioning means adapted to co-operate with a positioning means arranged on a rotatable pipe detector means having a selected radial direction of pipe detection to establish an angular reference position for said detector means;
positioning said pipe detector means in its reference position;
rotating said pipe detector means from its reference position and detecting and permanently recording the angular position of another pipe string relative to said fixed reference positioning means;
orienting in said one pipe string the direction of perforation of a perforator having a selected radial direction of perforation as determined by the recorded angular position of said reference positioning means and the recorded angular position of said other pipe string; and then
actuating said perforator to perforate.

15. A method for use in a well bore containing a plurality of pipe strings arranged in side-by-side relationship comprising the steps of:
arranging in one of said pipe strings at least one fixed reference positioning means adapted to cooperate with a positioning means arranged on a rotatable pipe detector means having a selected radial direction of pipe detection to establish an angular reference position for said detector means;
positioning said pipe detector means in its reference position; and
rotating said pipe detector means from its reference position and detecting and permanently recording the angular position of another pipe string relative to said fixed reference positioning means.

References Cited in the file of this patent
UNITED STATES PATENTS

| | | |
|---|---|---|
| 2,228,623 | Ennis | Jan. 14, 1941 |
| 2,419,468 | Smith | Apr. 22, 1947 |
| 2,464,930 | Herzog | Mar. 22, 1949 |
| 2,469,461 | Russell | May 10, 1949 |
| 2,476,137 | Doll | July 12, 1949 |
| 2,580,544 | Herzog | Jan. 1, 1952 |
| 2,631,671 | Krasnow et al. | Mar. 17, 1953 |
| 2,653,007 | Aston | Sept. 22, 1953 |
| 2,785,754 | True | Mar. 19, 1957 |
| 2,891,620 | Bielstein | June 23, 1959 |
| 2,896,718 | Kibby | July 28, 1959 |
| 2,938,584 | Tausch et al. | May 31, 1960 |
| 2,998,068 | True | Aug. 29, 1961 |
| 3,011,550 | Kennedy | Dec. 5, 1961 |
| 3,012,608 | McLaren | Dec. 12, 1961 |